United States Patent
Weinberg et al.

(10) Patent No.: US 6,385,857 B1
(45) Date of Patent: May 14, 2002

(54) POSITION DETECTORS, METHODS OF DETECTING POSITION, AND METHODS OF PROVIDING POSITIONAL DETECTORS

(75) Inventors: David M. Weinberg, Idaho Falls; L. Dean Harding, Chubbuck; Eric D. Larsen, Idaho Falls, all of ID (US)

(73) Assignee: Bechtel BWXT Idaho LLC., Idaho Falls, ID (US)

( * ) Notice: Subject to any disclaimer, the term of this patent is extended or adjusted under 35 U.S.C. 154(b) by 0 days.

(21) Appl. No.: 09/336,916

(22) Filed: Jun. 21, 1999

(51) Int. Cl.[7] .............................. G01C 9/06; G01C 9/10
(52) U.S. Cl. ........................................ 33/366.11; 33/365
(58) Field of Search .............................. 33/1 N, 1 BB, 33/4 PT, 313, 304, 340, 341, 365, 366.11, 366.15, 366.16, 366.24, 370, 371, 376, 391, 412, 529, 372, 373; 73/637, 638, 660, 622

(56) References Cited

U.S. PATENT DOCUMENTS

| | | | | |
|---|---|---|---|---|
| 959,912 A | * | 5/1910 | Bell | 33/208 |
| 2,607,126 A | * | 9/1952 | Sekki | 33/529 |
| 3,056,209 A | * | 10/1962 | Oliver | 33/554 |
| 3,780,442 A | * | 12/1973 | Gresho | 33/178 E |
| 3,826,013 A | * | 7/1974 | Baher | 33/340 |
| 4,375,724 A | * | 3/1983 | Brock | 33/529 |
| 4,476,635 A | * | 10/1984 | Hart | 33/228 |
| 4,583,296 A | * | 4/1986 | Dell'Acqua | 33/366 |
| 4,902,413 A | * | 2/1990 | Bellwood | 33/551 |
| 5,172,484 A | * | 12/1992 | Triola | 33/534 |
| 5,180,986 A | * | 1/1993 | Swartz et al. | 33/366 |
| 5,194,859 A | * | 3/1993 | Warren | 340/853.4 |
| 5,450,677 A | * | 9/1995 | Casey | 33/529 |
| 5,535,149 A | * | 7/1996 | Mori et al. | 708/322 |
| 5,564,193 A | * | 10/1996 | Brooks | 33/304 |
| 5,606,124 A | * | 2/1997 | Doyle et al. | 73/152.01 |
| 5,646,611 A | * | 7/1997 | Dailey et al. | 340/853.6 |
| 5,761,818 A | * | 6/1998 | Hopkins et al. | 33/366 |

FOREIGN PATENT DOCUMENTS

| | | | | |
|---|---|---|---|---|
| EP | 566212 A1 | * | 12/1996 | B23K/5/08 |
| JP | 363305208 A | * | 12/1988 | 33/542 |

OTHER PUBLICATIONS

*Merriam Webster's Collegiate Dictionary*, ©1996, pp. 94 and 668, (total pp. 4).

* cited by examiner

Primary Examiner—Diego Gutierrez
Assistant Examiner—Mirellys Jagan
(74) Attorney, Agent, or Firm—Wells, St. John, Roberts, Gregory & Matkin

(57) ABSTRACT

Position detectors, welding system position detectors, methods of detecting various positions, and methods of providing position detectors are described. In one embodiment, a welding system positional detector includes a base that is configured to engage and be moved along a curved surface of a welding work piece. At least one position detection apparatus is provided and is connected with the base and configured to measure angular position of the detector relative to a reference vector. In another embodiment, a welding system positional detector includes a weld head and at least one inclinometer mounted on the weld head. The one inclinometer is configured to develop positional data relative to a reference vector and the position of the weld head on a non-planar weldable work piece.

31 Claims, 6 Drawing Sheets

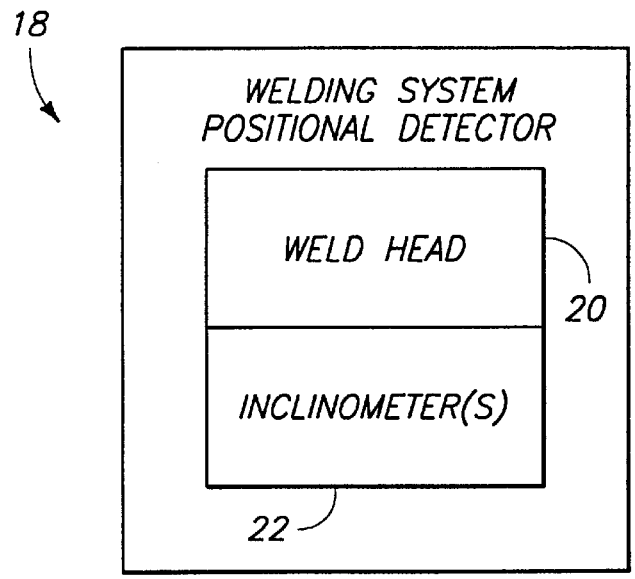
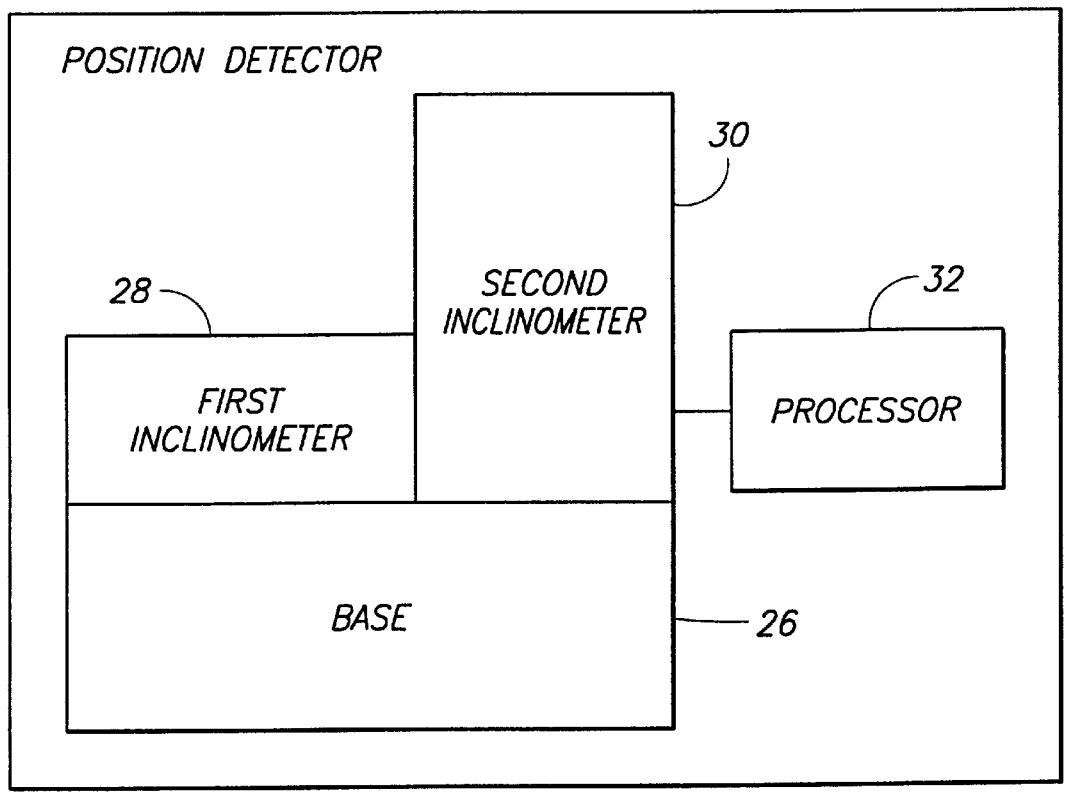

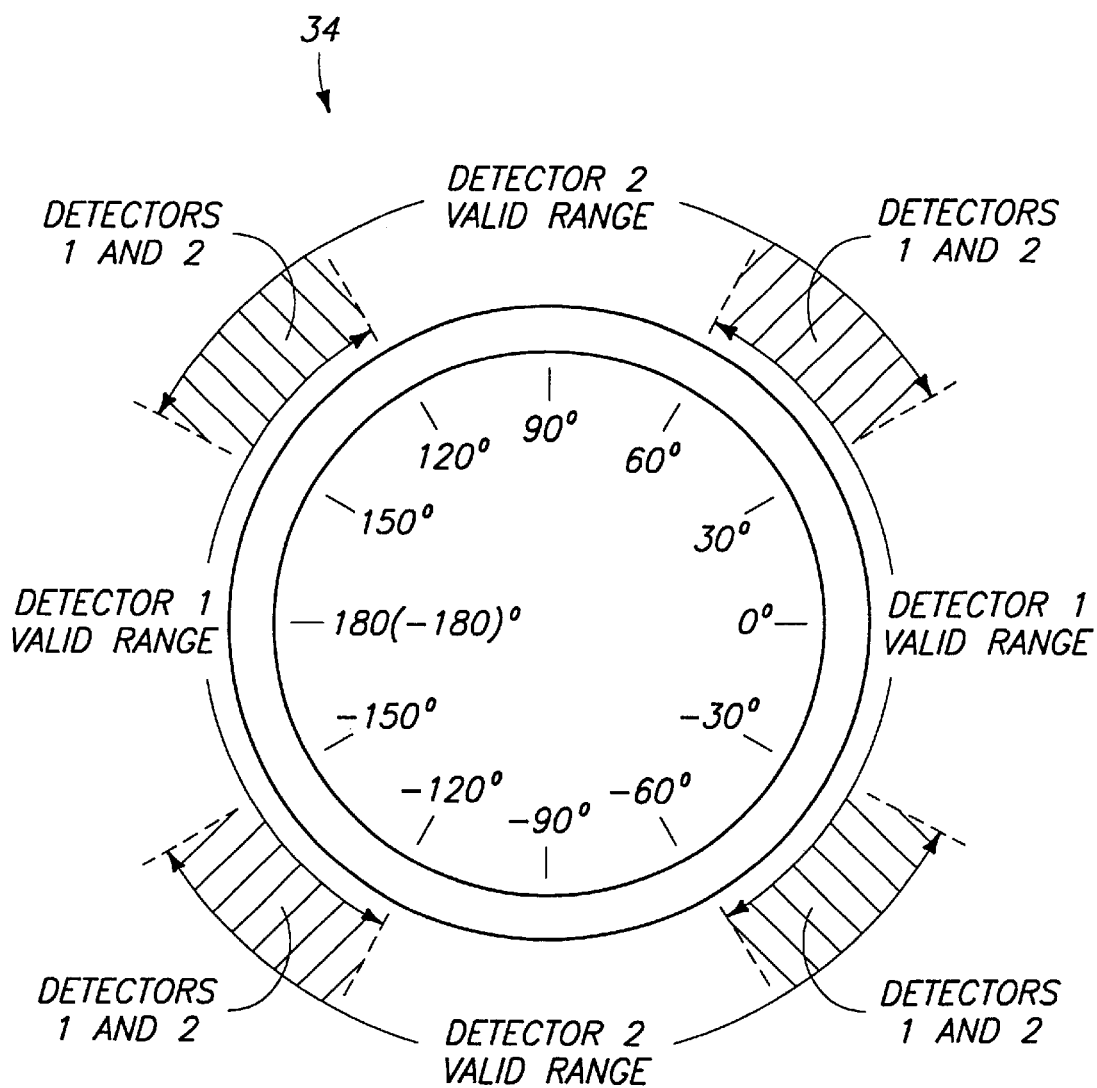

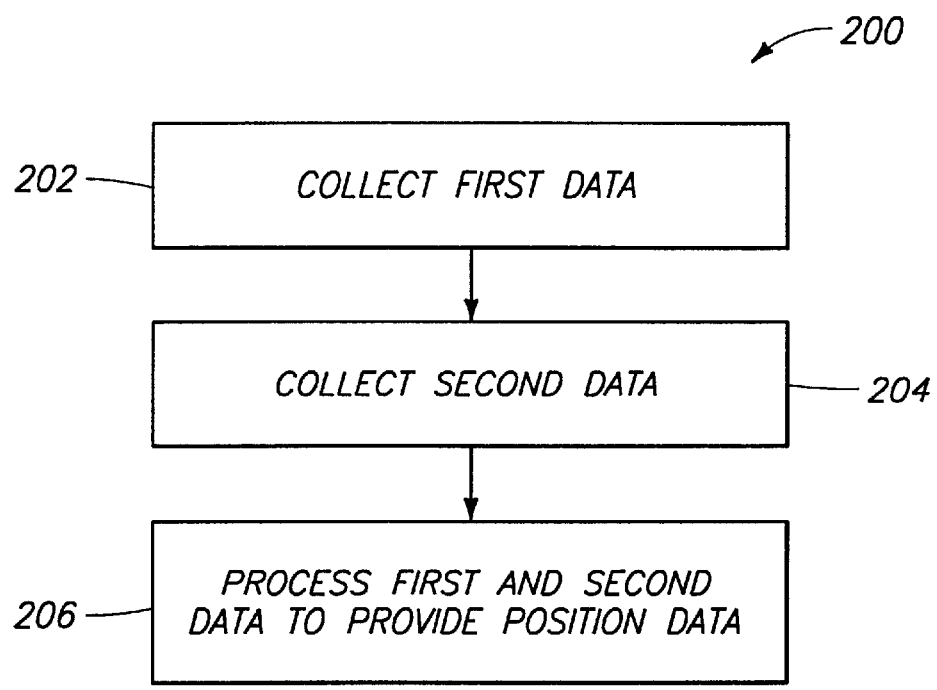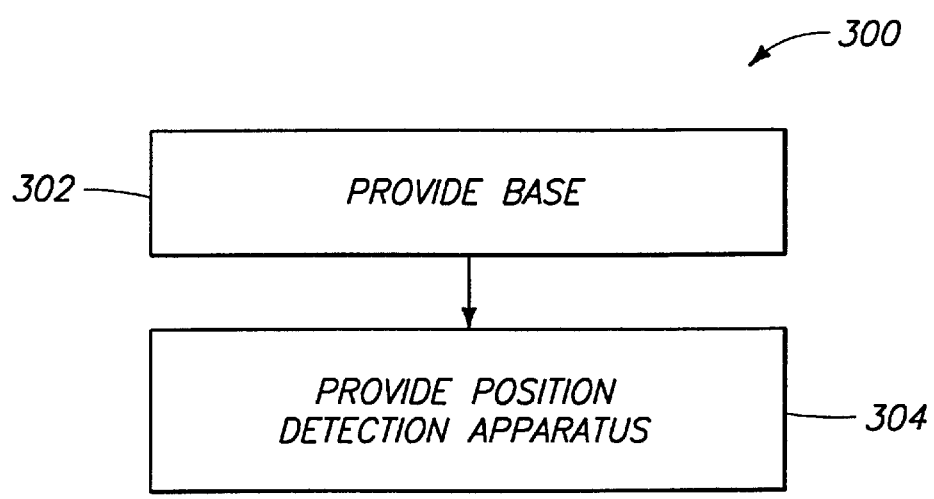

POSITION DETECTORS, METHODS OF DETECTING POSITION, AND METHODS OF PROVIDING POSITIONAL DETECTORS

CONTRACTUAL ORIGIN OF THE INVENTION

The United States Government has rights in this invention pursuant to Contract No. DE-AC07-94ID13223 between the United States Department of Energy and Lockheed Martin Idaho Technologies Company.

TECHNICAL FIELD

The present invention relates to position detectors, to methods of detecting various positions, and to methods of providing position detectors.

BACKGROUND OF THE INVENTION

When working on a work piece, it is often desirable to be able to determine or calculate with some degree of precision, the location of a working tool that is being used to work upon the work piece. This can enable, in many instances, valuable positional data to be developed for the purpose of assisting in the work that is being done on the work piece. For example, the working tool might be an inspection device that is inspecting the work piece for a particular condition. Accordingly, if the particular condition is found, it may be desirable to pin point the location of the particular condition at the same time that the inspection is taking place.

One specific example of a working tool is a welding head that comprises part of a welding system. A welding head can be used to not only weld a work piece, but, with the appropriate sensors, also to inspect a weld once in place. With respect to the latter, pin pointing exact locations of welding flaws can be extremely helpful and save valuable processing time when a welding defect is found and repaired.

Against this backdrop, a continuing need exists for position detectors, particularly in the field of welding systems, that enable a position to be detected quickly and precisely so that such information can be used to further operate upon a given work piece. Accordingly, this invention arose out of concerns associated with providing improved position detectors and methods of detecting positions.

SUMMARY OF THE INVENTION

Position detectors, welding system position detectors, methods of detecting various positions, and methods of providing position detectors are described. In one embodiment, a welding system positional detector includes a base that is configured to is engage and be moved along a curved surface of a welding work piece. At least one position detection apparatus is provided and is connected with the base and configured to measure angular position of the detector relative to a reference vector.

In another embodiment, a welding system positional detector includes a weld head and at least one inclinometer mounted on the weld head. The one inclinometer is configured to develop positional data relative to a reference vector and the position of the weld head on a non-planar weldable work piece.

In another embodiment, a position detector includes a base that is configured to engage and be moved along a generally curved surface. A first inclinometer is connected with the base and is movable therewith along a curved surface. The first inclinometer is configured to develop first positional data relative to a reference vector. A second inclinometer is connected with the base and is movable therewith along the curved surface. The second inclinometer is configured to develop second positional data relative to the reference vector.

In yet another embodiment, a method of detecting various positions of an instrument relative to a curved surface of a work piece which is worked upon by the instrument includes the steps of collecting first data describing an angular relationship between a first sensor on the instrument and a reference vector. Second data is collected describing an angular relationship between a second sensor on the instrument and the reference vector. The first and second data are processed to provide position data relative to the position of the instrument on the work piece.

In another embodiment, a method of providing a welding system positional detector includes providing a base that is configured to engage and be moved along a curved surface of a welding work piece. At least one position detection apparatus is provided and is connected with the base and configured to measure angular position of the detector relative to a reference vector.

BRIEF DESCRIPTION OF THE DRAWINGS

Preferred embodiments of the invention are described below with reference to the accompanying drawings, which are briefly described below.

FIG. 3 is a block diagram of a welding system positional detector in accordance with one embodiment of the invention.

FIG. 4 is a block diagram of a position detector in accordance with another embodiment of the invention.

FIG. 5 is a conceptual diagram of a cross-section of a work piece having superimposed thereon a range of degrees that assist in understanding one embodiment of the invention.

FIG. 8 is a flow diagram that describes processing in accordance with one embodiment of the invention.

FIG. 9 is a flow diagram that describes processing in accordance with one embodiment of the invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
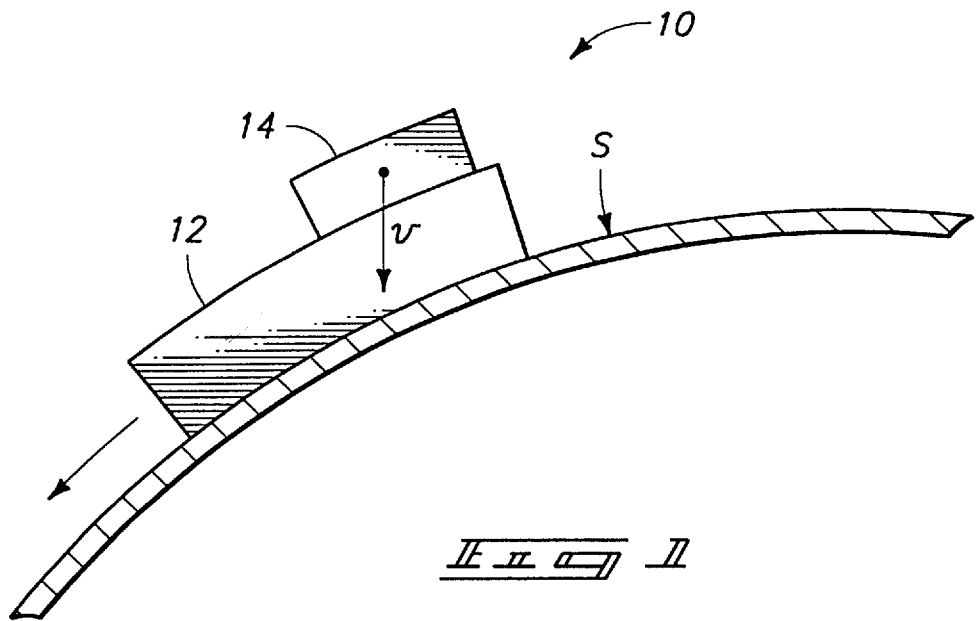
FIG. 1 is a side elevational view of a position detector in accordance with one embodiment of the invention.

FIG. 1 shows a positional detector generally at 10 in accordance with one embodiment of the invention. Positional detector 10 includes a base 12 and at least one position detection apparatus 14. Base 12 is preferably configured to engage and be moved along a curved surface S of a work piece. Position detection apparatus 14 is connected with base 12 and is configured to measure the angular position of detector 10 relative to a reference vector. In a preferred embodiment, positional detector 10 comprises part of a welding system and the work piece that provides surface S is a welding work piece. Exemplary welding systems that include welding heads upon which a position detection apparatus can be mounted are described in U.S. patent application Ser. No. 09/066,723, filed on Apr. 23, 1998, now U.S. Pat. No. 6,125,705 and in U.S. patent application Ser. No. 09/196,399, filed on Nov. 19, 1998, now U.S. Pat. No. 6,178,819, both assigned to the assignee of the present application, the disclosures of which are incorporated by reference.

It will be appreciated that any configuration of curved surface can be provided, and that positional detector 10 is configured to work upon any such surface. As will be discussed below, some curved surfaces can define a cylinder (either an outside or an inside surface), and the positional detector is preferably configured to provide an angular position at any point on the surface. In addition, the surface need not have a regular shape, as is shown. Rather, the surface can vary in its regularity. And, although any suitable reference vector can be used to measure angular position, it has been found particularly advantageous in environments that have a meaningful gravity to let gravity define the reference vector. It should be understood, however, that in other environments, other reference vectors can advantageously be utilized.

Figure 2:
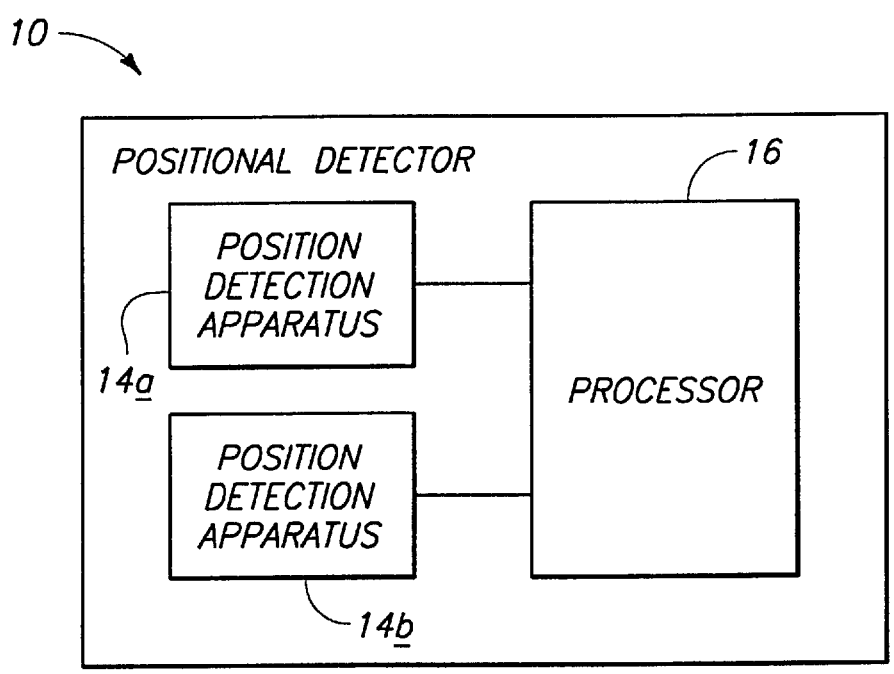
FIG. 2 is a block diagram of a positional detector in accordance with one embodiment of the invention.

FIG. 2 shows one embodiment of a positional detector 10. In this embodiment, two position detection apparatus 14a, 14b are provided and configured to measure separate or different angular positions relative to the reference vector. The angular positions are then used to derive the position of detector 10. In accordance with this embodiment, a processor 16 is provided and is operably coupled with position detection apparatus 14a, 14b, and is configured to receive the data produced thereby and derive therefrom the position of the detector. In one preferred embodiment, position detection apparatus 14a, 14b comprise separate angle-measuring devices that are configured to measure a tangent angle of the curved surface S (FIG. 1) relative to the reference vector and produce data representative thereof.

A preferred type of angle-measuring device is an inclinometer. Accordingly, in the FIG. 2 embodiment, apparatus 14a, 14b can comprise a pair of inclinometers. The provided inclinometers are preferably angularly-offset from one another so that each provides a different range of angles that can be used by processor 16 to calculate a position. In one arrangement, the inclinometers are offset 90° from one another, although any suitable offset can be used. Although any suitable inclinometer can be used in the embodiments that employ the use of inclinometers, an inclinometer available from Jewell Electrical Instruments of Manchester, N.H., now owned by WPI Industrial Technologies, and bearing Make No. LCI-90 and Model No.459999-003, has been found to work particularly well.

In accordance with another embodiment, the curved surface S of FIG. 1 is defined, at least in part, by either or both of an outside surface of a generally cylindrical pipe or an inside surface of a generally cylindrical pipe. Particular types of pipes can form the basis of a work piece upon which welding takes place. The welding that takes place can take place either on the outside or inside surface. Accordingly, in those embodiments that are employed in the context of welding systems, positions on the outside and inside of the pipe can be inspected and positions ascertained in accordance with the invention.

FIG. 3 shows a welding system positional detector in accordance with another embodiment generally at 18. Detector 18 comprises a weld head 20 and at least one inclinometer 22 mounted on weld head 20. Inclinometer 22 is preferably configured to develop positional data relative to a reference vector and the position of weld head 20 on a non-planar weldable work piece. One example of a non-planar weldable work piece is the curved surface S of FIG. 1. It will be appreciated, however, that other non-planar weldable work pieces can be operated upon and need not necessarily be curved in nature. In a preferred embodiment a plurality of inclinometers 22 are mounted on weld head 20 and are configured to develop different positional data relative to the reference vector. In a most preferred embodiment, two such inclinometers are provided and mounted on the weld head 20. Exemplary suitable inclinometers were given above.

FIG. 4 shows a position detector generally at 24 in accordance with another embodiment of the invention. Position detector 24 includes a base 26 that is configured to engage and be moved along a generally curved surface. A first inclinometer 28 is provided and is connected with base 26. A second inclinometer 30 is provided and is connected with base 26 as well. Both inclinometers are movable with the base along the curved surface. The first and second inclinometers 28, 30 are configured to develop first and second positional data respectively, relative to a reference vector. Preferably, the reference vector is provided by gravity, but as will be appreciated, any suitable reference vector can be used.

A processor 32 is provided and is preferably configured to receive the first and second positional data provided by the first and second inclinometers 28,30. Processor 32 can then calculate a position based thereon. The term "processor" as used in this document will be understood to include, without limitation, any general purpose or special purpose instrument or computer that can be programmed to operate upon the data that is provided, by the various position detection apparatus or, in this case, inclinometers.

In one embodiment, the inclinometers 28, 30 are mounted on base 26 in a manner which permits them to collect positional datathrough first and second defined ranges of angles. Such ranges of angles, are preferably different so that each inclinometer collects different positional data even though they are mounted on the same base. As will become apparent in the example that is discussed just below, the first and second ranges can and preferably do overlap. In one embodiment where the ranges of angles overlap, processor 32 is configured to assign weights to the first and second positional data to provide weighted first and second positional data. The position that is then calculated by the processor is calculated based on the weighted positional data.

FIG. 5 shows an exemplary work piece generally at 34 in the form of a cross-section of a generally cylindrical pipe. This cross-section has been subdivided, for illustrative purposes, into different ranges of angles. The angles range from 0° to 180° in the top half of the work piece; and from 0° to −180° in the bottom half of the work piece. The sensors or detectors are mounted so that they are angularly offset from one another so that each is able to develop its position data through a different defined range of angles. In the present example, the first detector has an effective range from +90° to −90°, although in this example a valid range is considered from +60° to −60°, and from +120° to −120°. The second detector has an effective range from 0° to 180°, although in this example a valid range is considered from 30° to 150°, and from −30° to −150°. In this manner, each detector is able to develop valid position data within its is valid ranges. As can be seen from the crosshatched areas in FIG. 5, the detectors are also arranged so that their valid ranges overlap with one another to some extent. In these areas of overlap, both detectors can validly be used to determine position on a work piece. In the above-described specific inclinometer example, a voltage that is provided from the sensors is used as a measure of degrees. Typically, in order to gather positional data from around the entire periphery of the illustrated work piece, in this specific example, the assembly to which the inclinometers are mounted is physically removed from the work piece after gathering information from a first section of the work piece (e.g. a range extending from 90° to −90° on the right half of the workpiece), flipped, and then placed on the workpiece so that it can gather information on the second section (e.g. a range extending from 90° to −90° on the left half of the workpiece). It is possible that the assembly could gather information continuously about the entire periphery of the workpiece without being removed. Such could, for example, be accomplished through a modification in the software algorithms that process the positional data that is gathered.

Figure 6:
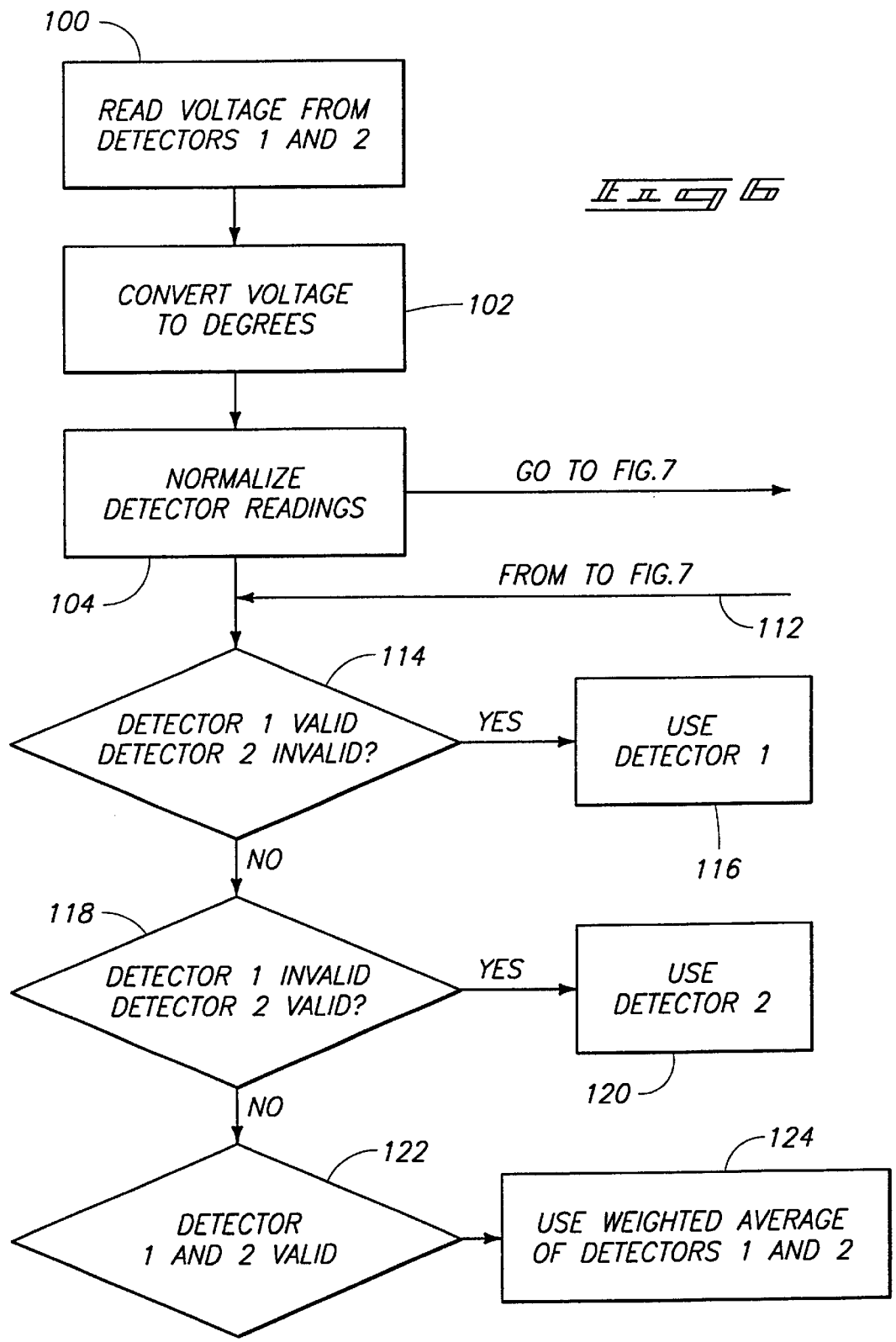
FIG. 6 is a flow diagram that describes processing in accordance with one embodiment of the invention.
Figure 7:
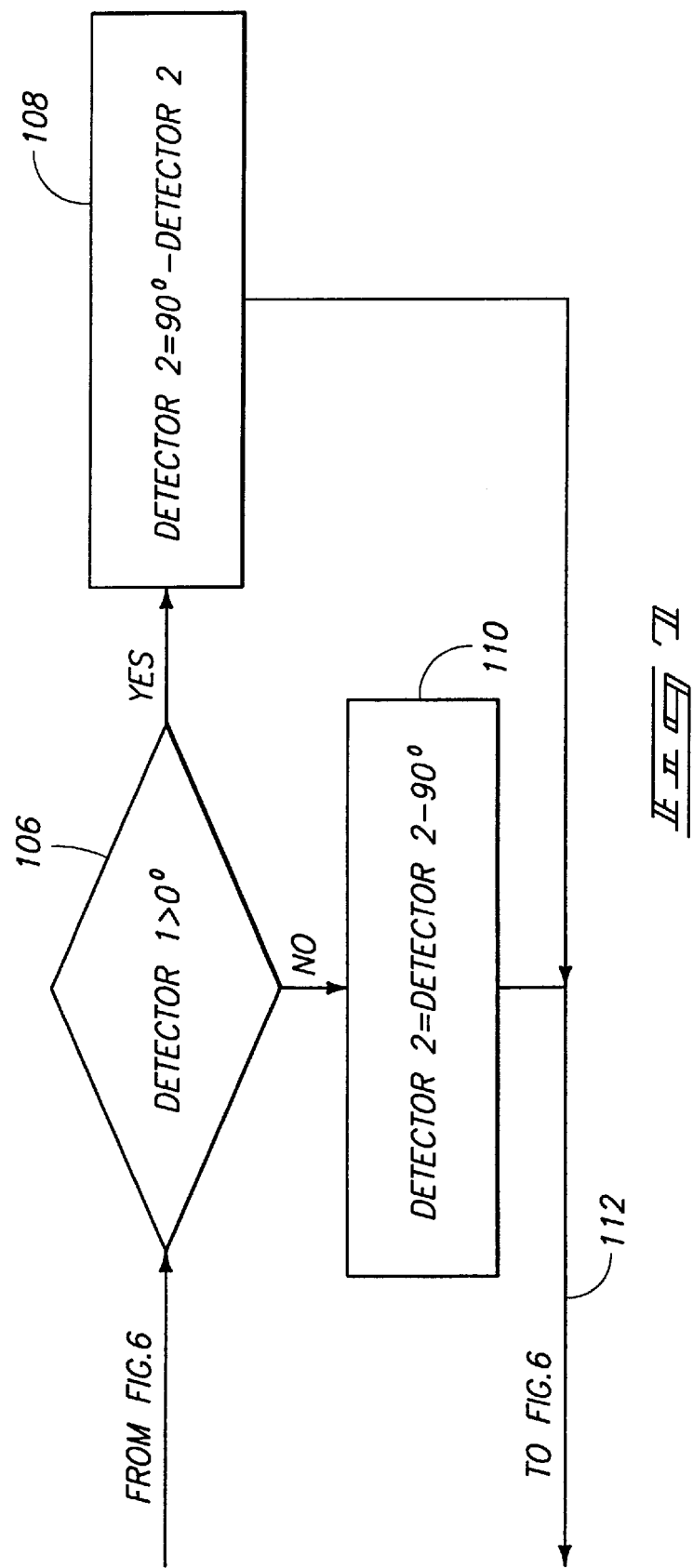
FIG. 7 is a flow diagram that is a continuation of the FIG. 6 flow diagram.

FIGS. 6 and 7 show flow diagrams that describe processing in accordance with one embodiment of the invention. Steps 100 and 102 read the voltage from detectors 1 and 2 and convert the voltages to degrees. Step 104 normalizes the detector readings. Normalization is necessary, in some embodiments, because the detectors are mounted to be angularly offset from one another. Thus, in this example, detector 2 is normalized or corrected because it is mounted perpendicular to detector 1. This means that its reading must be corrected by 90°. How this particular correction or normalization takes place depends on the position of the detectors on the work piece. In this example, such depends on whether the detector is on the top half or the bottom half of the work piece of FIG. 5. Normalization can take place in any number of ways. In this example it has been found to be advantageous to do this correction based upon the reading from detector 1. Even if detector 1 is outside of its valid range, it will still give a reading that is greater or less than 0 to indicate which half of the work piece it is on.

Accordingly, and with reference to FIG. 7, a normalization process is described. Step 106 checks to determine whether detector 1 gives a reading that is greater than 0°.

If detector 1's reading is greater than 0°, this means that both sensors are located on the top half of the work piece. Accordingly, detector 2 is corrected by subtracting its reading from 90° at 108. If, on the other hand, detector 1's reading is found to be less than 0°, then step 110 corrects detector 2's reading by subtracting 90° therefrom. After detector 2 is normalized or corrected, branch 112 returns to the processing shown in FIG. 6.

Continuing steps 114, 118 and 122 collectively determine which detector or combination of detectors to use to ascertain a position on the work piece. If detector 1 is valid (in its valid range of angles) and detector 2 is invalid (in its invalid range of angles), then step 114 branches to step 116 which then uses the reading of detector 1. In FIG. 5, this corresponds to the range of angles between −30° and 30°, and −150° and 150°. If detector 1 is invalid and detector 2 is valid, step 118 branches to step 120 which uses the reading of detector 2. This corresponds to the ranges between 60° and 120°, and −60° to −120° in FIG. 5. If both detectors are valid, step 122 branches to step 124 and uses a weighted average of detectors 1 and 2. These valid ranges correspond to the crosshatched areas in FIG. 5. Accordingly, the angle collectively measured by both detectors is calculated as follows:

Angle=$f$* detector 1+($1f$)* detector 2, where $f$=($abs$(detector 1)−60)/(−30).

As an example, assume that detector 1 measures an angle that is 75° and that the initial reading for detector 2 is 15°. Following the normalization process of FIG. 7, detector 2 is corrected to have a reading of (90°−15°)=75°. Because detector 1 is outside of its valid range, the reading of detector 2 or 75° is used. As another example, assume that detector 1 reads −35° and that the initial reading for detector 2 is 55°. The corrected reading for detector 2 is (55°−90°) or −35°. Since both detectors 1 and 2 are valid, using the equation set forth above, an angle of −35° is calculated.

FIG. 8 shows a flow diagram of certain methodical steps in accordance with one embodiment of the invention. Flow diagram 200 describes a method of detecting various positions of an instrument relative to a curved surface of a work piece that is worked upon by the instrument. Step 202 collects first data describing angular relationship between a first sensor on the instrument and a reference vector. Step 204 collects second data describing an angular relationship between a second sensor on the instrument and the reference vector. Step 206 processes the first and second data to provide position data relative to the position of the instrument on the work piece. In one embodiment, first and second data is collected at steps 202, 204 by moving the first and second sensors over the curved work piece. In another embodiment, the first and second sensors comprise inclinometers and the reference vector is provided by gravity. The inclinometers are preferably moved over the curved surface in a manner which enables the first and second data to be collected. One example of how this can be done is given above in connection with FIGS. 5,6 and 7. Other ways of collecting the first and second data can, of course, be used without departing from the spirit and scope of the invention.

FIG. 9 shows a flow diagram generally at 300 that describes various steps in accordance with another method of the invention. Flow diagram 300 describes a method of providing a welding system positional detector and includes, at 302, providing a base that is configured to engage and be moved along a curved surface of a welding work piece. Step 304 provides at least one position detection apparatus connected with the base and configured to measure angular position of the detector relative to a reference vector. In one embodiment, the base is moved along a curved surface of a welding work piece and the angular position is measured relative to a reference vector. Preferably, a plurality of position detection apparatus are provided that are configured to measure different angular positions of the detector relative to a reference vector. In a most preferred embodiment, two such position detection apparatus are provided. In yet another embodiment, the position detection apparatus comprises at least one, and preferably two inclinometers that are configured to measure angular information relative to a reference vector that is provided by gravity.

Advantages of the various embodiments of the invention described just above include numerous advantages that stem from the fact that the position of a particular piece of equipment can be located with precision relative to a work piece that is being worked upon. In the specific context of welding systems, by being able to locate with precision a location of a weld head, for example, various flaws in a weld can be located in real time which enables any detected flaws to be remedied, on the spot, rather than waiting until further downstream processing has taken place which would needlessly complicate correction of any flaws that are later found. Numerous other advantages of the various embodiments described above will be apparent to those of skill in the art.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claims:

1. A welding system positional detector comprising:
   a base configured to engage and be moved along a curved surface of a welding work piece; and
   at least two position detection apparatuses connected with the base and configured to measure the angular position of the detector relative to a reference vector, wherein said at least two position detection apparatuses are configured to measure positional data relative to a reference vector by moving the at least two position detection apparatuses over the curved surface and wherein said at least two position detection apparatuses comprise:
      an angle-measuring device configured to measure a tangent angle of the curved surface relative to the reference vector and produce data representative thereof; and
      a processor operably coupled with the angle-measuring device and configured to receive the data produced thereby and derive therefrom the position of the detector.

2. The welding system positional detector of claim 1, wherein the reference vector is provided by gravity.

3. The welding system positional detector of claim 1, wherein said at least two position detection apparatus comprises a pair of position detection apparatus configured to measure separate angular positions relative to the reference vector, which angular positions can be used to derive the position of the detector.

4. The welding system positional detector of claim 1, wherein said at least two position detection apparatuses comprise a pair of position detection apparatus configured to measure different angular positions relative to the reference vector, which angular positions can be used to derive the position of the detector.

5. The welding system positional detector of claim 1, wherein said at least two position detection apparatuses comprise at least one inclinometer.

6. The welding system positional detector of claim 1, wherein said at least two position detection apparatuses comprise a pair of inclinometers.

7. The welding system positional detector of claim 1, wherein said at least two position detection apparatuses comprise a pair of angularly-offset inclinometers.

8. The welding system positional detector of claim 7, wherein the inclinometers are offset 90° from one another.

9. The welding system positional detector of claim 1, wherein the curved surface is defined at least in part by the outside surface of a generally cylindrical pipe.

10. The welding system positional detector of claim 1, wherein the curved surface is defined at least in part by the inside surface of a generally cylindrical pipe.

11. A welding system position detector comprising:
    a base configured to engage and be moved along a generally curved surface of a welding work piece;
    a first inclinometer connected with the base and movable therewith along the curved surface, the first inclinometer being configured to measure a tangent angle of the curved surface relative to a reference vector; and
    a second inclinometer connected with the base and movable therewith along the curved surface, the second inclinometer being configured to measure a tangent angle of the curved surface relative to the reference vector.

12. The position detector of claim 11, wherein the reference vector is provided by gravity.

13. The position detector of claim 11, wherein the first inclinometer is configured to develop the first positional data through a first defined range of angles, and wherein the second inclinometer is configured develop the second positional data through a second defined range of angles, the first range being different from the second range.

14. The position detector of claim 13, wherein the first and second ranges overlap.

15. The position detector of claim 11 further comprising a processor configured to receive the first and second positional data and calculate a position based thereon.

16. The position detector of claim 11 further comprising a processor operably coupled with the first and second inclinometers and configured to receive the first and second positional data and calculate a position based thereon.

17. The position detector of claim 16, wherein the processor is configured to assign weights to the first and second positional data to provide weighted first and second positional data, and calculate said position based on said weighted first and second positional data.

18. The position detector of claim 11 wherein the base is configured to engage and be moved along a generally cylindrical surface.

19. The position detector of claim 18, wherein the cylindrical surface defines an outside cylinder.

20. The position detector of claim 18, wherein the cylindrical surface defines an inside cylinder.

21. The position detector of claim 11, wherein the first and second inclinometers are configured to develop respective first and second positional data relative to the reference vector by moving the first and second inclinometers over the curved surface.

22. A method of detecting various positions of an instrument relative to a curved surface of a work piece which is worked upon by the instrument comprising:
    collecting first data describing an angular relationship between a first sensor on the instrument and a reference vector;
    collecting second data describing an angular relationship between a second sensor on the instrument and the reference vector; and
    processing the first and second data to provide position data relative to the position of the instrument on the work piece, wherein the collecting of the first and second data comprises moving the first and second sensors over the curved surface.

23. The method of claim 22, wherein the first and second sensors comprise inclinometers and the reference vector is provided by gravity.

24. A method of detecting various positions of an instrument relative to a curved surface of a work piece which is worked upon by the instrument comprising:
    collecting first data describing an angular relationship between a first sensor on the instrument and a reference vector;
    collecting second data describing an angular relationship between a second sensor on the instrument and the reference vector; and
    processing the first and second data to provide position data relative to the position of the instrument on the work piece, wherein the first and second sensors comprise inclinometers and the collecting of the first and second data comprises moving the inclinometers over the curved surface.

25. A method of providing a welding system positional detector comprising:

providing a base configured to engage and be moved along a curved surface of a welding work piece; and providing at least two position detection apparatus connected with the base and configured to measure angular position of the detector relative to a reference vector by moving the at least two position detection apparatus over the curved surface.

26. The method of claim 25 further comprising moving the base along a curved surface of a welding work piece and measuring the angular position of the at least two position detection apparatus relative to the reference vector.

27. The method of claim 25 wherein the providing of said at least two position detection apparatus comprises providing a plurality of position detection apparatus configured to measure different angular positions of the detector relative to the reference vector.

28. The method of claim 25 wherein the providing of said at least two position detection apparatus comprises providing two position detection apparatus configured to measure different angular positions of the detector relative to the reference vector.

29. The method of claim 25 wherein the providing of said at least two position detection apparatus comprises providing an inclinometer configured to measure angular information relative to a reference vector provided by gravity.

30. The method of claim 25 wherein the providing of said at least two position detection apparatus comprises providing a plurality of inclinometers configured to measure angular information relative to a reference vector provided by gravity.

31. The method of claim 25 wherein the providing of said at least two position detection apparatus comprises providing two inclinometers configured to measure angular information relative to a reference vector provided by gravity.

* * * * *